Figure 1:
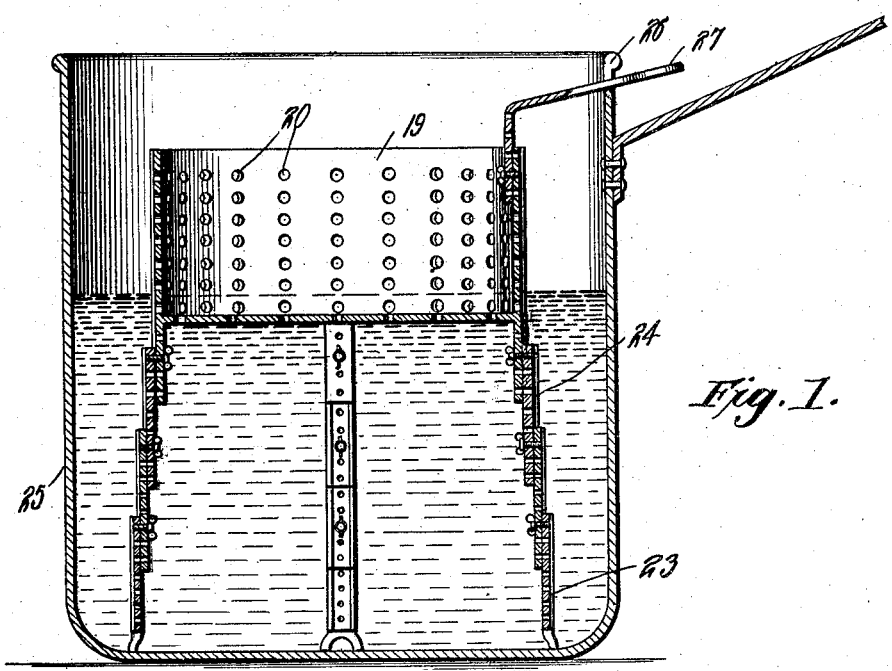

J. McFARLAND.
COOKING UTENSIL.
APPLICATION FILED OCT. 2, 1916.

1,305,818.

Patented June 3, 1919.

WITNESSES
W. C. Fielding
Lloyd W. Patch

INVENTOR
John McFarland
BY Richard Owen
ATTORNEY

UNITED STATES PATENT OFFICE.

JOHN McFARLAND, OF NEW YORK, N. Y., ASSIGNOR OF ONE-HALF TO CHARLES M. NIXON, OF NEW YORK, N. Y.

COOKING UTENSIL.

1,305,818.  Specification of Letters Patent.  Patented June 3, 1919.

Application filed October 2, 1916. Serial No. 123,395.

*To all whom it may concern:*

Be it known that I, JOHN McFARLAND, a citizen of the United States, residing at New York city, in the county of New York and State of New York, have invented certain new and useful Improvements in Cooking Utensils, of which the following is a specification.

This invention relates to an improvement in cooking utensils and more particularly to devices of this sort intended for use in cooking vegetables, soups, and other like eatables, which contain solids which would in the ordinary culinary vessel fall to the bottom and remain there in an inert state where scorching or burning might occur, and it is an object of my invention to provide a utensil which is so constructed that the vegetables or other solids which are being boiled will be held out of contact with the bottom of the liquid containing receptacle, thus insuring that the contents of the utensil will not be scorched or burned.

Yet another object is to provide a structure which permits use of the utensil as a steamer and has in this adaptation, means to support the food which is being steamed at a point to have steam passed therethrough and therearound.

With the above and other objects in view, my invention consists in certain novel features of construction and the combination of parts which will be hereinafter set forth in connection with the drawings and then more particularly pointed out in the claim.

In the drawings:—

Figure 2:
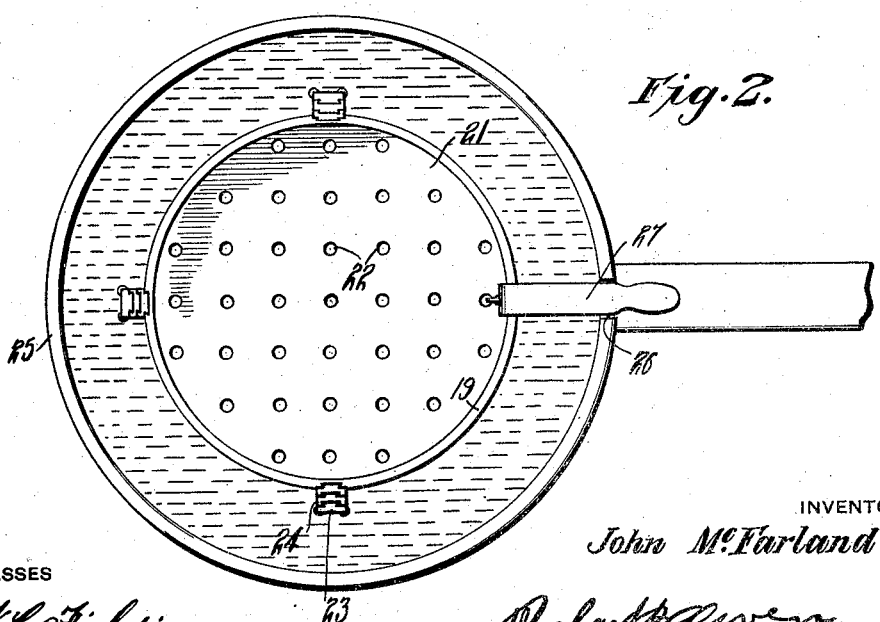

Figure 1 is a view in vertical section of my invention, and Fig. 2 is a view thereof in plan.

In the form of the device as shown in Figs. 1 and 2, the outer container 25 is a liquid-tight vessel of substantially standard form and construction with the exception that adjacent to the handle 2 thereof it is preferable that the upper edge of the side wall be cut or notched away slightly as indicated at 26.

The device comprises a container 19 of sheet metal, perforated throughout to permit the free passage of fluid. As shown, perforations 20 are formed in the side wall of the container, and the bottom 21 thereof is formed with the perforations 22. Leg members 23 and extension leg members 24 are provided, and are formed for dove-tailed interlocking engagement, suitable set-screws or pins being provided to hold these parts in the proper set relations.

As stated above the outer container 25 has a notch 26 formed in the rim thereof to permit fitting of the handle 27 by which the inner container 19 may be lifted.

The foods which are to be cooked by steaming are placed in the cage-like container 19 and water is poured into the outer container 25 to the proper level to either come up slightly into the container 19 or to rise to a level below this container and when the utensil is placed at such a point that heat is applied thereto, steam will be generated as the water boils and the food products supported in the container 19 will be steam-cooked.

While I have herein shown and described only a specific form of the device, it will be understood that a greater or lesser number of leg and extension leg members than here shown may be used, that various other forms of slide joints may be constructed in conjunction with the leg and extension leg members, and that a number of other changes and modifications may be resorted to in the form and arrangement of the parts without departing from the spirit and scope of my invention, in view of which I do not desire to be limited to the exact disclosure, but rather only to such points as may be set forth in the claim.

I claim:—

In combination, a cooking utensil comprising an outer vessel having a notch formed in its rim, an inner vessel formed with a plurality of series of vertically spaced openings extending around the vessel, extensible supporting legs for the inner vessel to support the same upon the bottom of the outer vessel and to position said inner vessel at various heights, a bent handle having one end provided with a vertical series of apertures and the other end extending through the notch of the outer vessel, and a bolt extending through one of the apertures of the handle and into one of the apertures of the inner vessel, whereby to permit the handle to be retained in the notch in different positions of said inner vessel.

In testimony whereof I affix my signature in presence of two witnesses.

JOHN McFARLAND.

Witnesses:
JAMES A. CALLAHAN,
FRANCIS T. LEONARD.

Copies of this patent may be obtained for five cents each, by addressing the "Commissioner of Patents, Washington, D. C."